United States Patent
Wang et al.

(10) Patent No.: US 12,156,102 B2
(45) Date of Patent: Nov. 26, 2024

(54) METHOD AND DEVICE FOR FLOW CONTROL

(71) Applicant: SAMSUNG ELECTRONICS CO., LTD., Suwon-si (KR)

(72) Inventors: Hong Wang, Beijing (CN); Weiwei Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 17/816,938

(22) Filed: Aug. 2, 2022

(65) Prior Publication Data

US 2023/0043833 A1 Feb. 9, 2023

(30) Foreign Application Priority Data

Aug. 3, 2021 (CN) .......................... 202110888168.0

(51) Int. Cl.
*H04W 4/06* (2009.01)
*H04W 28/02* (2009.01)

(52) U.S. Cl.
CPC .......... *H04W 4/06* (2013.01); *H04W 28/0252* (2013.01)

(58) Field of Classification Search
None
See application file for complete search history.

(56) References Cited

U.S. PATENT DOCUMENTS

| | | | |
|---|---|---|---|
| 2019/0150220 A1 | 5/2019 | Byun et al. | |
| 2020/0228245 A1* | 7/2020 | Shi | ........................ H04W 80/08 |
| 2022/0060283 A1* | 2/2022 | Wang | ........................ H04L 1/08 |

FOREIGN PATENT DOCUMENTS

WO 2021143868 A1 7/2021

OTHER PUBLICATIONS

Korean Intellectual Property Office, "Decision of Patent" dated Nov. 3, 2023, in connection with Korean Patent No. 10-2023-7009882, 5 pages.
Samsung, "Discussion on CP-based and UP-based congestion mitigation in Rel-17 IAB", 3GPP TSG-RAN WG3 Meeting #112e, May 17-21, 2021, R3-211943, 4 pages.
Lenovo et al., "User Plane Protocol Aspects of F1-U for NR MBS", 3GPP TSG-RAN WG3 Meeting #111e, May 17-27, 2021, R3-212184, 2 pages.

(Continued)

*Primary Examiner* — Ayanah S George

(57) ABSTRACT

The disclosure relates to a 5G or 6G communication system for supporting a higher data transmission rate. A method performed by a first node in a wireless communication system, including receiving, from a second node, downlink user data through a first radio bearer, the downlink user data including multicast service data; transmitting, to at least one UE, the downlink user data through a second radio bearer; and transmitting, to the second node, a downlink data delivery status including PDCP sequence number information, wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

16 Claims, 7 Drawing Sheets

(56) References Cited

OTHER PUBLICATIONS

Huawei et al., "(TP to TS 38.401 BL CR) Bearer management over F1 and E1", 3GPP TSG-RAN WG3 Meeting #112-e, May 17-28, 2021, R3-212436, 9 pages.
"3rd Generation Partnership Project; Technical Specification Group Radio Access Network; NG-RAN; NR user plane protocol (Release 16)", 3GPP TS 38.425 V16.3.0 (Apr. 2021), 25 pages.
International Search Report and Written Opinion of the International Searching Authority dated Nov. 14, 2022 in connection with International Patent Application No. PCT/KR2022/011403, 6 pages.
Office Action dated Nov. 6, 2023, in connection with Japanese Patent Application No. Application No. 2023-532216, 3 pages.
Supplementary European Search Report dated Nov. 17, 2023, in connection with European Patent Application No. 22853428.5, 10 pages.
Office Action dated Aug. 22, 2023, in connection with Korean Patent Application No. 10-2023-7009882, 5 pages.
Decision of Patent dated Nov. 3, 2023, in connection with Korean Patent Application No. 10-2023-7009882, 8 pages.
Qualcomm Inc, "NR Multicast and Broadcast Radio Bearer Architecture aspects", R2-2100318, Revision of R2-2009036, 3GPP TSG-RAN WG2 Meeting #113e, E-Meeting: Jan. 25-Feb. 5, 2021, 12 pages.
CATT (moderator), "Summary of discussion on MBS Bearer Management over F1/E1", R3-212791, 3GPP TSG RAN WG3 #112-e, E-meeting, May 17-27, 2021, 8 pages.
Qualcomm Inc et al., "NR Multicast PTM bearer RLC AM mode operation", R2-2105020, Revision of R2-2103188, 3GPP TSG-RAN WG2 Meeting #114e, E-Meeting: May 19-28, 2021, 10 pages.
Communication pursuant to Article 94(3) EPC dated Jun. 26, 2024, in connection with European Patent Application No. 22853428.5, 6 pages.

* cited by examiner

METHOD AND DEVICE FOR FLOW CONTROL

CROSS-REFERENCE TO RELATED APPLICATION

This application is based on and claims priority under 35 U.S.C. § 119 to Chinese Patent Application No. 202110888168.0, filed Aug. 3, 2021, the disclosure of which is incorporated by reference herein in its entirety.

BACKGROUND

1. Field

The present application relates to wireless communication technology, and specifically, to a method and device for improved multicast transmission.

2. Description of Related Art

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

SUMMARY

According to an embodiment of the present disclosure, there is provided a method of a first node in a wireless communication system, including receiving, from a second node, downlink user data through a first radio bearer, the downlink user data including multicast service data; transmitting, to at least one user equipment (UE), the downlink user data through a second radio bearer; and transmitting, to the second node, a downlink data delivery status including packet data convergence protocol (PDCP) sequence number information, wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

In an embodiment, the downlink data delivery status information further includes a desired buffer size for the first radio bearer or the second radio bearer.

In an embodiment, the first transmission mode is a PtP (Point-to-Point) mode and the second transmission mode is a PtM (Point-to-Multipoint) mode.

In an embodiment, the second node is a node hosting the PDCP entity and the first node is a corresponding node interacting with the second node.

According to an embodiment of the present disclosure, there is provided a method of a second node in a wireless communication system, including transmitting, to a first node, downlink user data through a first radio bearer, the downlink user data including multicast service data; and receiving, from the first node, a downlink data delivery status including packet data convergence protocol (PDCP) sequence number information, wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

According to an embodiment of the present disclosure, there is provided a first node in a wireless communication system, including a transceiver configured to transmit and receive a signal; and a processor coupled with the transceiver and configured to: receive, from a second node, downlink user data through a first radio bearer, the downlink user data including multicast service data, transmit, to at least one user equipment (UE), the downlink user data through a second radio bearer, and transmit, to the second node, a downlink data delivery status including packet data convergence protocol (PDCP) sequence number information, wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

According to an embodiment of the present disclosure, there is provided a second node in a wireless communication system, including a transceiver configured to transmit and receive a signal; and a processor coupled with the transceiver and configured to: transmit, to a first node, downlink user data through a first radio bearer, the downlink user data including multicast service data, and receive, from the first node, a downlink data delivery status including packet data convergence protocol (PDCP) sequence number information, wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
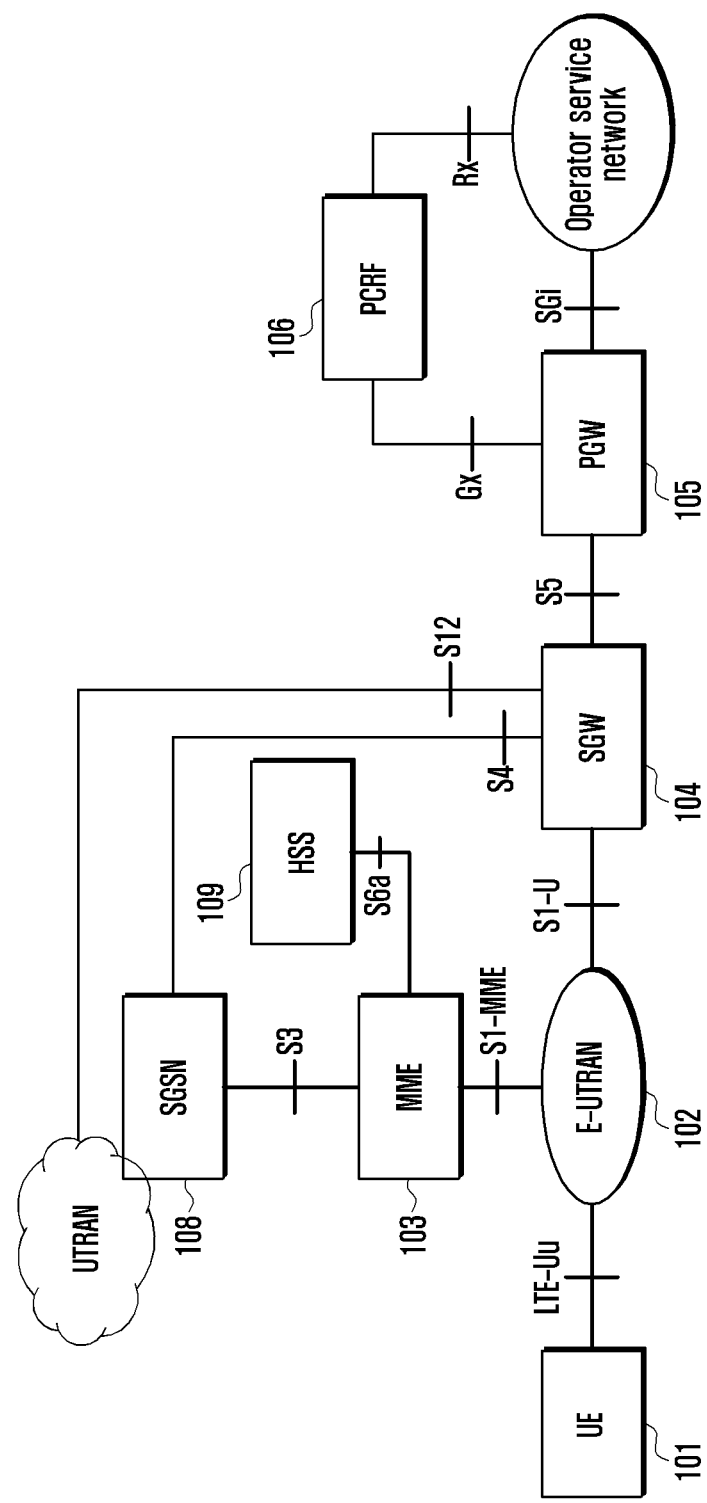
FIG. 1 illustrates a system architecture diagram of system architecture evolution (SAE)

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

FIGS. 1 to 7 discussed below and various embodiments for describing the principles of the present disclosure in this patent document are only for illustration and should not be interpreted as limiting the scope of the disclosure in any way. Those skilled in the art will understand that the principles of the present disclosure can be implemented in any suitably arranged system or device.

FIG. 1 is an exemplary system architecture 100 of system architecture evolution (SAE). User equipment (UE) 101 is a terminal device for receiving data. An evolved universal terrestrial radio access network (E-UTRAN) 102 is a radio access network, which includes a macro base station (eNodeB/NodeB) that provides UE with interfaces to access the radio network. A mobility management entity (MME) 103 is responsible for managing mobility context, session context and security information of the UE. A serving gateway (SGW) 104 mainly provides functions of user plane, and the MME 103 and the SGW 104 may be in the same physical entity. A packet data network gateway (PGW) 105 is responsible for functions of charging, lawful interception, etc., and may be in the same physical entity as the SGW 104. A policy and charging rules function entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and packet data context of the user equipment, etc.

Figure 2:
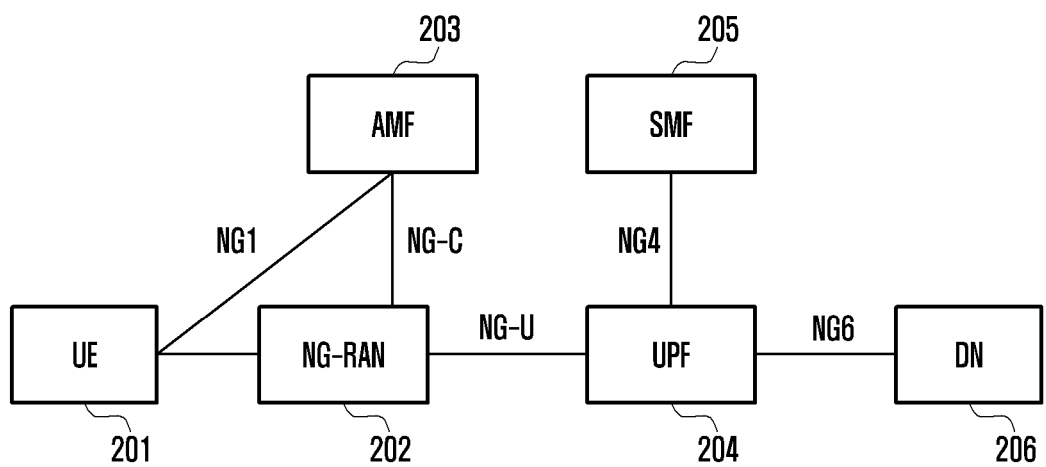
FIG. 2 illustrates a schematic diagram of an initial overall architecture of 5G.

FIG. 2 is an exemplary system architecture 200 according to various embodiments of the present disclosure. Other embodiments of the system architecture 200 can be used without departing from the scope of the present disclosure.

User equipment (UE) 201 is a terminal device for receiving data. A next generation radio access network (NG-RAN) 202 is a radio access network, which includes a base station (a gNB or an eNB connected to 5G core network 5GC, and the eNB connected to the 5GC is also called ng-gNB) that provides UE with interfaces to access the radio network. An access control and mobility management function entity (AMF) 203 is responsible for managing mobility context and security information of the UE. A user plane function entity (UPF) 204 mainly provides functions of user plane. A session management function entity SMF 205 is responsible for session management. A data network (DN) 206 includes, for example, services of operators, access of Internet and service of third parties.

Exemplary embodiments of the present disclosure are further described below with reference to the accompanying drawings.

The text and drawings are provided as examples only to help understand the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

The present disclosure describes a method and device for flow control in multicast transmission. According to the method and/or device of the embodiments of the disclosure, the extra overhead of multicast data transmission can be avoided or reduced, the utilization efficiency of access network resources and/or air interface resources can be improved, and the delay of transmission can be reduced. In addition, according to the method and/or device of the embodiments of the present disclosure, it is enabled that when a multicast transmission mode is converted, the loss of data and the delay due to the transmission mode conversion can be reduced.

An NG-RAN may be in a form of a separate architecture. At this time, a base station contains three logical entities: a CU-CP, a CU-UP and a DU. In addition, the CU-UP and the CU-CP may also belong to a logical entity. There is only a user plane protocol between the CU-UP and the DU, and only a control plane protocol between the CU-CP and the DU. The CU-UP transmits downlink data to the DU through a process of downlink user data transmission, and for a multicast service, this process is related to a certain wireless data bearer for the multicast service. When the CU transmits the downlink data, the CU assigns an F1 user plane (F1-U) sequence number to each PDCP PDU packet, and then transmits the F1-U sequence number to the DU together with the user data. In addition to the F1-U sequence number, each PDCP PDU packet itself has a PDCP PDU sequence number (SN).

The DU transmits a PDCP PDU received from the F1 user plane (F1-U) to a UE. According to the sequence number of the PDCP PDU, the DU may detect whether there is a packet lost among the received packets at the F1-U, and in a case that there is a lost packet, record a PDCP PDU sequence number corresponding to the lost packet.

A downlink data delivery status is used to respond to a certain specific downlink PDCP PDU SN, and is transmitted only when all packets below this specific PDCP PDU SN have been successfully transmitted to the UE in sequence (in a case of an RLC AM mode) or have been transmitted to a lower layer (in a case of an RLC UM mode) (the lower layer of the PDCP is a radio link layer RLC layer). The DU records a highest PDCP sequence number of the PDCP PDUs successfully transmitted to the UE in sequence, or records a highest PDCP sequence number of the PDCP PDUs that have been transmitted to the lower layer. The DU transmits the downlink data delivery status to the CU-UP, in which the above PDCP sequence number is carried. When the DU transmits the downlink data delivery status to the CU-UP, sequence numbers of PDCP PDUs that are successfully transmitted, but not successfully transmitted in sequence, may also be contained.

The purpose of the downlink data delivery status is to provide feedback to the CU-UP, and make the CU-UP control flow of the downlink data based on information in the downlink data delivery status, so as to control the successful transmitting of the downlink data by the DU. When the RLC transmits the downlink data delivery status, the DU may transmit uplink data simultaneously.

For the multicast service, there is only the downlink data, and no uplink data. In a case of the multicast service, the downlink data delivery status may contain the following information:

a highest PDCP sequence number of the PDCP PDUs successfully transmitted in sequence if the mode is the RLC AM mode;
sequence numbers of the PDCP PDUs successfully transmitted out of order if the mode is the RLC AM mode;
a desired buffer size, in a unit of bits;
a desired rate;
lost data detected by the DU, that is, sequence numbers of PDCP PDUs that have not been reported;
a highest PDCP sequence number of the PDCP PDUs transmitted to the lower layer protocol in sequence if the mode is the RLC UM mode.

When the CU-UP receives the downlink data delivery status, it may perform flow control of multicast data based on the information included in the downlink data delivery status. In an implementation, the CU-UP may regard the received desired buffer size or desired rate as an amount of data to be transmitted to the DU. If the desired buffer size is 0, the CU-UP stops transmitting data to the DU. When the desired buffer is greater than 0, the CU-UP may transmit a corresponding amount of data to the DU, for example, it may transmit the amount of data indicated by the desired buffer size to the DU from the received highest PDCP PDU sequence number, according to the received highest PDCP PDU sequence number. When receiving the highest sequence number of the PDCP PDUs successfully transmitted in sequence, the CU-UP may delete corresponding PDCP PDUs, for example, delete PDCP PDUs with sequence numbers less than or equal to the highest sequence number.

If the CU-UP transmits data of the multicast service, the CU-UP may transmit the data of the multicast service to the DU, and the DU transmits the downlink data delivery status to the CU-UP, and the CU-UP may adjust the amount of data transmitted to the DU according to this. The multicast service may have two transmission modes: point-to-point (PtP) channel transmission or point-to-multipoint (PtM) channel transmission. If it is decided by the DU whether to adopt a point-to-point channel or a point-to-multipoint channel to transmit data to the UE, and if a shared tunnel is established between the CU-UP and the DU to transmit data of a certain multicast service, or several multicast radio bearers are established corresponding to a certain multicast service and a shared tunnel is established between the CU-UP and the DU to transmit data of a multicast radio bearer, then for a same multicast radio bearer, only one shared tunnel is established on the F1 to transmit the data of the multicast service. After the CU-UP transmits the data to the DU, it is decided by the DU whether to transmit it to the UE through the PtM channel or the PtP channel.

If it is transmitted through the PtP channel, there is a dedicated wireless channel for each user who wants to receive the multicast service. However, because a channel state of each user is different, accordingly, a resource scheduled by the DU for each UE is different, which will result in a different speed at which the multicast service is transmitted. The traditional reporting method of the downlink data delivery status cannot reflect this situation well, so it is difficult for the CU-UP to make decisions according to a downlink data delivery status which is more in line with the actual situation when performing the flow control. Therefore, it is necessary to design an appropriate method to better report a transmission status of the downlink data at the DU to the CU-UP.

According to an exemplary aspect of the present disclosure, there is provided a method for multicast transmission, including receiving, by a first node, multicast service data from a second node; and transmitting, by the first node, a downlink data delivery status including information related to a packet data convergence protocol (PDCP) sequence number to the second node, wherein the information related to the PDCP sequence number is related to a transmission mode of the multicast service data at the first node.

In some implementations, wherein the transmission mode includes a first mode and/or a second mode, and the information related to the PDCP sequence number includes at least one of: a largest/highest PDCP sequence number and/or a smallest/lowest PDCP sequence number among highest PDCP sequence numbers successfully transmitted in sequence in the first mode and/or highest PDCP sequence numbers successfully transmitted to a lower layer in the second mode; a largest/highest PDCP sequence number among the highest PDCP sequence numbers successfully transmitted in sequence in the first mode; a smallest/lowest PDCP sequence number among the highest PDCP sequence numbers successfully transmitted in sequence in the first mode; a highest PDCP sequence number successfully transmitted to the lower layer in the second mode; indication information of whether a first mode state and/or a second mode state are included, which is used to indicate whether the downlink data delivery status includes a transmission status of the first mode and/or the second mode; and indication information of whether a largest/highest PDCP sequence number and/or a smallest/lowest PDCP sequence number are included, which is used to indicate whether the downlink data delivery status includes a largest/highest value and/or a smallest/lowest value among highest PDCP sequence numbers successfully transmitted in sequence.

Some aspects of the present disclosure are described below in connection with exemplary embodiments, in sequence to facilitate those skilled in the art to understand the principles of the present disclosure. Therefore, it is obvious that the following description is only exemplary and does not limit the scope of the present disclosure to any exemplary aspects.

Figure 3:
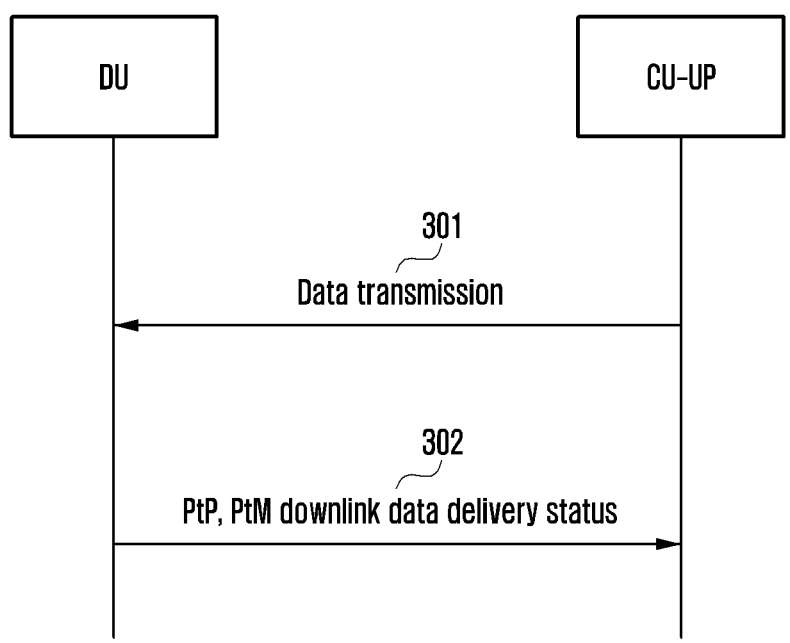
FIG. 3 illustrates a schematic diagram of an example embodiment according to an aspect of the present disclosure.

FIG. 3 illustrates a schematic diagram of an embodiment according to an aspect of the present disclosure. According to the method shown in FIG. 3, a DU may transmit a downlink data state to a CU-UP. The method shown in FIG. 3 includes the following steps:

At step 301, the CU-UP transmits data to the DU.

When the CU-UP receives data of a certain multicast service, the CU-UP maps the data of the multicast service onto a certain corresponding multicast radio bearer, and after processing it by a PDCP protocol layer, such as adding a PDCP sequence number, and encrypting the data, etc., transmits it to the DU through an F1 tunnel corresponding to the radio bearer. In this embodiment, the CU-UP does not need to know whether the DU adopts a PtP or PtM mode to process the multicast service data.

After receiving the data, the DU saves the data in a buffer, and transmits the data to an RLC layer of the PtP channel or an RLC layer of the PtM channel correspondingly according to a decision currently made by the DU with respect to a transmission mode (PtP or PtM) of the multicast data. The RLC layer of the PtP channel is related to each UE, and for each user who wants to receive the multicast service, a base station establishes an RLC layer of the PtP channel, while the RLC layer of the PtM channel is related to the multicast radio bearer, and for each multicast radio bearer, the base station establishes an RLC layer.

At a certain moment, the DU may make a new decision according to signal quality of a physical layer. For example, when receiving a packet with a PDCP sequence number of 13, the DU decides to convert the transmission from the PtM mode to the PtP mode. In this case, data of the PDCP sequence number after 13 will be transmitted to the PtP RLC for processing. In this case, the DU transmits packets of the PDCP sequence number after 13 to an RLC protocol layer of each PtP channel respectively through data duplication processing.

At step 302, the DU transmits a downlink data delivery status to the CU-UP.

According to a configured cycle, or according to other configurations, or based on triggering of a predetermined event, the DU transmits the downlink data delivery status to the CU-UP.

In downlink data delivery status reporting, the DU may transmit the downlink data delivery status to the CU-UP by adopting one of the following methods.

Method 1: current reporting information is reused to the greatest extent, and the DU only reports one sequence number regarding the successfully transmitted PDCP PDU. Specifically, the sequence number of the PDCP PDU selected by the DU for reporting may be a sequence number of a PDCP PDU transmitted in the PtP mode or a sequence number of a PDCP PDU transmitted in the PtM mode. The DU includes one or more of the following information in the downlink data delivery status and transmits it to the CU:

the highest PDCP PDU sequence number successfully transmitted in sequence, or the highest PDCP PDU sequence number successfully transmitted to a lower layer. The DU selects the largest/highest PDCP sequence number from PtP transmission and/or PtM transmission. This sequence number reflects how fast the DU transmits data. It should be understood that "/" represents "and/or", and selecting of a largest PDCP sequence number described throughout this patent application may also be expressed as selecting of a highest PDCP sequence number, that is, "largest" and "highest" may be used interchangeably when selecting of a PDCP sequence number from PDCP sequence numbers is described.

a desired buffer size, in a unit of bits. The desired buffer is for this multicast radio bearer, and does not distinguish whether the transmission is the PtM or PtP mode.

After receiving the status information, the CU-UP may adjust data flow transmitted to the DU according to the desired buffer size and the highest PDCP PDU sequence number. Because the highest PDCP PDU sequence number included in the status information is a largest PDCP sequence number selected by the DU from the PtP transmission and/or the PtM transmission, it will prevent the CU-UP from transmitting excessive data to the DU, to result in buffer overflow of the DU. In this method, the CU-UP does not know what method the DU adopts to transmit the data, and does not know a sequence number of a PDCP currently transmitted in the PtP or PtM mode. To solve this problem, in this method, indication information of the PtP or PtM mode can be carried in the downlink data delivery status transmitted by the DU, to indicate whether the DU adopts the PtP or PtM mode. Accordingly, according to the indication information, the CU-UP can know whether the sequence number of the PDCP PDU included in the downlink data delivery status is for the PtP or the PtM.

Method 2: the DU transmits states with respect to the PtP and PtM mode transmissions to the CU-UP. For the PtP transmission, according to different quality of air channels, scheduling of data transmitted by the base station to each user is different, so a downlink transmission status of each user may be different. Therefore, for different users, the highest PDCP PDU sequence number successfully transmitted in sequence may be different. The DU selects a largest sequence number from highest PDCP PDU sequence numbers successfully transmitted in sequence for different UEs, and informs the CU-UP of the largest sequence number through the downlink data delivery status. In this method, specifically, the DU contains one or more of the following information in the downlink data delivery status and transmits it to the CU-UP:

State 1 of the PtP transmission representing that the highest PDCP PDU sequence number successfully transmitted in sequence is obtained by: selecting, by the DU, a largest PDCP sequence number from highest PDCP PDU sequence numbers of the PtP transmission successfully transmitted in sequence for different UEs.

a state of the PtM transmission representing the highest PDCP PDU sequence number transmitted to the lower layer in sequence.

indication information of whether a PtP state and/or a PtM state is contained. This information indicates whether the downlink data delivery status includes a PtP transmission status and/or a PtM transmission status. The indication information of whether the PtP state and/or the PtM state is contained may also indicate whether the DU adopts the transmission mode of PtP or PtM.

a desired buffer size, in a unit of bits. The desired buffer size is for the multicast radio bearer, and does not distinguish whether the transmission is in the PtM or PtP mode.

Method 3: for the PtP transmission, according to different quality of air channels, scheduling of data transmitted by the base station to each user is different, so the downlink data delivery status of each user may be different. Therefore, for different users, the highest PDCP PDU sequence number successfully transmitted in sequence may be different. The DU selects a smallest/lowest sequence number from the highest PDCP PDU sequence numbers of the PtP transmission successfully transmitted in sequence for different UEs, and informs the CU-UP of the smallest/lowest sequence number through the downlink data delivery status. It should be understood that "/" represents "and/or", and selecting of a smallest PDCP sequence number described throughout this patent application may also be expressed as selecting of a lowest PDCP sequence number, that is, "smallest" and "lowest" may be used interchangeably when selecting of a PDCP sequence number from PDCP sequence numbers is described.

In this method, the DU may contain one or more of the following information in the downlink data delivery status and transmit it to the CU-UP:

State 2 of the PtP transmission representing the highest PDCP PDU sequence number successfully transmitted in sequence. The DU selects a smallest PDCP sequence number from the highest PDCP PDU sequence numbers of the PtP transmission successfully transmitted in sequence for different UEs.

a state of the PtM transmission representing the highest PDCP PDU sequence number transmitted to the lower layer in sequence.

indication information of whether a PtP state and/or a PtM state is contained. This information indicates whether the downlink data delivery status includes a PtP transmission status and/or a PtM transmission status. The indication information of whether the PtP state and/or the PtM state is contained may also indicate whether the DU adopts the transmission mode of PtP or PtM.

a desired buffer size, in a unit of bits. The desired buffer size is for the multicast radio bearer, and does not distinguish whether the transmission is the PtM or the PtP.

Method 4: the DU reports multiple sequence numbers of PDCP PDUs transmitted through PtP. For the PtP transmission, according to different quality of air channels, scheduling of data transmitted by the base station to each user is different, so a downlink transmission status of each user may be different. Therefore, for different users, the highest PDCP PDU sequence number successfully transmitted in sequence may be different. The DU selects a largest sequence number and a smallest sequence number from highest PDCP PDU sequence numbers successfully transmitted in sequence for different UEs, and informs the CU-UP of the largest sequence number and the smallest sequence number through the downlink data delivery status. In this method, the DU may contain one or more of the following information in the downlink data delivery status and transmit it to the CU-UP:

State 1 of the PtP transmission representing the highest PDCP PDU sequence number successfully transmitted in sequence. The DU selects a largest PDCP sequence number from the highest PDCP PDU sequence numbers of the PtP transmission successfully transmitted in sequence for different UEs.

State 2 of the PtP transmission representing the highest PDCP PDU sequence number successfully transmitted in sequence. The DU selects a smallest PDCP sequence number from the highest PDCP PDU sequence numbers of the PtP transmission successfully transmitted in sequence for different UEs.

a state of the PtM transmission representing the highest PDCP PDU sequence number transmitted to the lower layer in sequence.

indication information of whether a PtP state and/or a PtM state is contained. This information indicates whether the downlink data delivery status includes a PtP transmission status and/or a PtM transmission status. The indication information of whether the PtP state and/or the PtM state is contained may also indicate whether the DU adopts the transmission mode of PtP or PtM.

indication information of whether a largest PDCP sequence number and/or a smallest PDCP sequence number is contained. This information indicates whether the downlink data delivery status contains a maximum value and/or a minimum value in the highest PDCP PDU sequence numbers successfully transmitted in sequence.

a desired buffer size, in a unit of bits. The desired buffer is for the multicast radio bearer, and it does not distinguish whether the transmission is the PtM or PtP mode.

After the CU-CP receives a state of the PtP transmission and/or a state of the PtM transmission, the CU-UP saves the transmission status. In an implementation, the state of the PtP transmission and/or the state of the PtM transmission received by the CU-UP may be used in the handover process of the UE described below.

Figure 4:
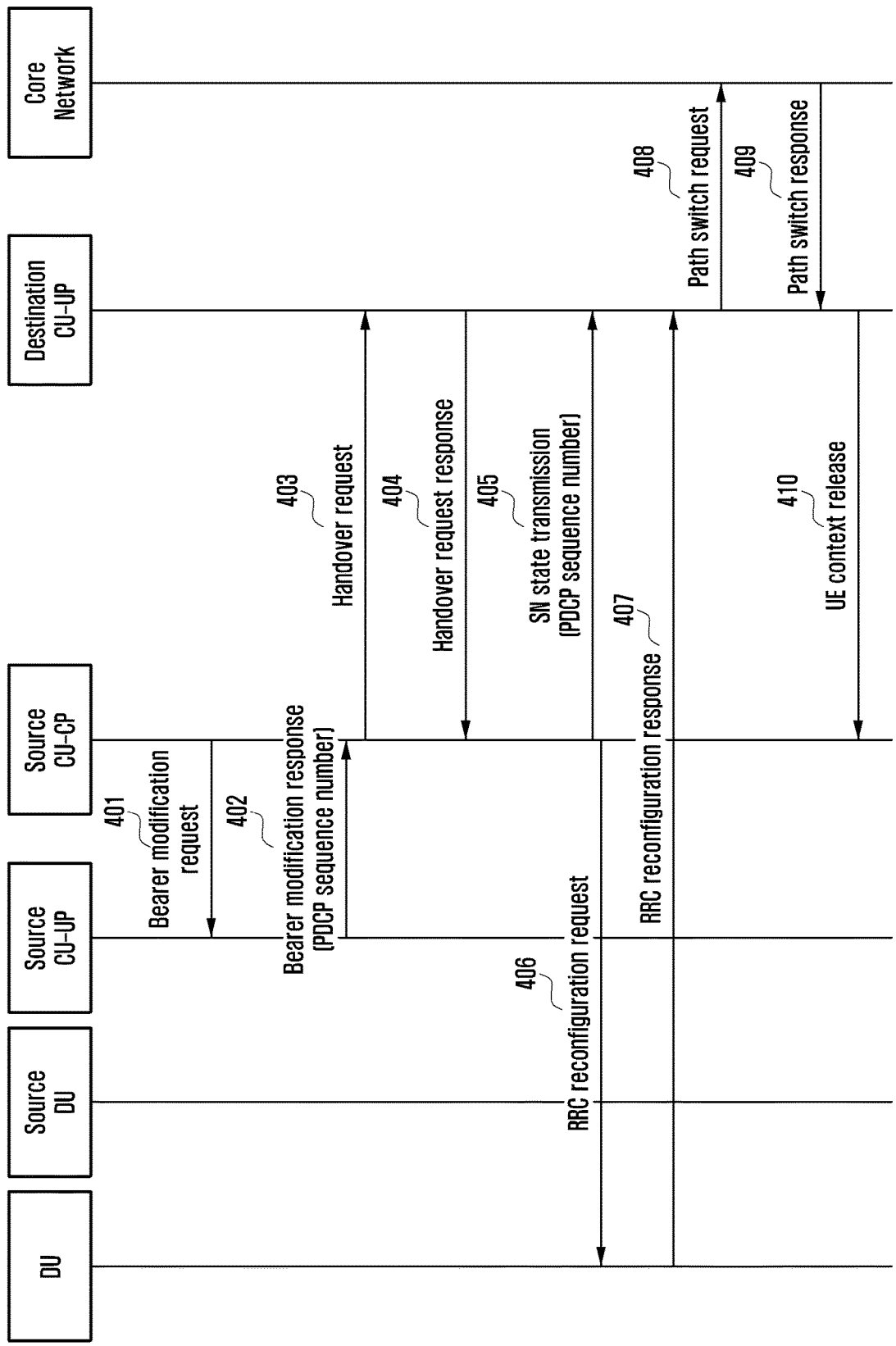
FIG. 4 illustrates a schematic diagram of an example embodiment according to another aspect of the present disclosure.

FIG. 4 illustrates a schematic diagram of an example embodiment according to another aspect of the present disclosure. The embodiment shown in FIG. 4 describes a process in which a source base station transmits PDCP status information to a destination base station during handover of a UE to another cell (for example, corresponding to another base station). The process of the handover described in FIG. 4 includes the following steps:

At step 401, a source base station CU-CP transmits a message to a source CU-UP, wherein the message is used to request a transmission status of a PDCP.

According to context information of the UE, the source base station CU-CP knows that the UE is receiving a multicast service, and the source base station CU-CP transmits the message to the source CU-UP, to request the CU-UP to transmit information related to a PDCP sequence number of the current multicast service to the CU-CP. The message may contain a service identification of the multicast service or an identification of a multicast radio bearer.

At step 402, the source CU-UP transmits a response message to the source base station CU-CP. The response message carries the transmission status of the PDCP, for example, the information included in the downlink data delivery status in the embodiment shown in FIG. 3.

The source base station CU-UP transmits the response message to the source base station CU-CP according to the downlink data delivery status received in, for example, the embodiment shown in FIG. 3. In an implementation, if the downlink data delivery status contains the above State 2 of the PtP transmission, that is, the smallest sequence number among the highest PDCP PDU sequence numbers successfully transmitted in sequence, which is a smallest PDCP sequence number selected by the DU from the highest PDCP PDU sequence numbers of the PtP transmission successfully transmitted in sequence for different UEs, the CU-UP transmits the smallest PDCP sequence number to the source CU-CP. Because this PDCP sequence number is less than or equal to the highest PDCP PDU sequence numbers actually transmitted to the UE, transmitting this sequence number to the destination base station and forwarding data to the destination base station according to this sequence number will cause some data to be repeatedly transmitted to the UE, but this has the benefit that the data loss can be reduced.

If the downlink data delivery status only contains the above State 1 of the PtP transmission, that is, the largest sequence number among the highest PDCP PDU sequence numbers successfully transmitted in sequence, which is a largest PDCP sequence number selected by the DU from the highest PDCP PDU sequence numbers of the PtP transmission successfully transmitted in sequence for different UEs, then in this case, the source CU-UP transmits the largest PDCP sequence number to the CU-CP. Because this largest PDCP sequence number is a largest PDCP sequence number selected from the highest PDCP PDU sequence numbers successfully transmitted in sequence, for the UE performing the handover, this PDCP sequence number is greater than or equal to the highest sequence number of the PDCP PDUs actually transmitted to the UE. Therefore, transmitting this sequence number to the destination base station and forwarding data to the destination base station according to this sequence number will cause data loss.

In addition to the SN of the PDCP PDU, transmission status information of a PDCP may contain a hyper frame number (HFN) corresponding to the PDU.

According to another aspect of the present disclosure, steps 401 and 402 may adopt the following modes.

At step 401, the source base station CU-CP transmits a request for transmission status information of the PDCP to the DU.

The CU-CP transmits a message to the DU, to request the DU to transmit the transmission status information of the PDCP of a certain MBS service or a certain MRB of a certain UE.

At step 402, the DU transmits the transmission status information of the PDCP to the CU-CP.

The DU transmits the transmission status information of the PDCP to the CU-CP. The status information contains information related to a PDCP sequence number corresponding to MBS data, and the information related to the PDCP sequence number contains an HFN and a PDCP SN of last data transmitted to the UE in sequence or last data transmitted to the UE.

Steps 401 and 402 may also be performed after step 403 or 404. If it is performed before step 403, the PDCP status information included in step 403 may be the SN status information obtained in step 402.

At step 403, the source base station initiates a handover request message to the destination base station.

The message carries a session identification of each PDU session requested, information on QoS flows contained in the PDU session, and DRB information etc. If the UE is receiving the MBS service, the message also contains an identification of the MBS service, a session identification corresponding to the MBS, QoS flow information corresponding to the MBS, and configuration information of a DRB transmitting the MBS. The message may also contain PDCP sequence number information of the MBS data. The PDCP sequence number information is, for example, the information included in the downlink data delivery status in the embodiment shown in FIG. 3.

The destination base station decides whether to transmit a message to a core network to request transmission of the MBS data according to whether a destination cell has already been transmitting the MBS service. If the destination cell has received the MBS service from the core network, the destination base station transmits a response message to the source base station.

If the destination cell on the destination base station has not received the MBS data from the core network, the destination base station transmits a message to the core network to request the core network to transmit data of the MBS service. The process of establishing a MBS bearer will not be repeated herein to avoid obscuring the main points of the present disclosure. Thereafter, the destination base station transmits the response message to the source base station.

At step 404, the destination base station transmits a handover request acknowledgement message to the source base station. The handover request acknowledgement message includes a transparent transmitter from the destination to the source.

The transparent transmitter from the destination to the source contains an RRC message transmitted by the destination base station to the UE.

The handover request acknowledgement message also contains information of a PDU session successfully established. The information of the PDU session contains an identification of the PDU session, an identification of a DRB successfully established, an identification of an MBS successfully established, and an identification of an MRB successfully established.

At step 406, the source base station transmits a handover execution command to the UE through an RRC reconfiguration message.

At step 405, the source base station transmits an SN state transmission to the destination base station.

If the information related to the PDCP sequence number corresponding to the MBS data received by the UE at the source base station is not included in the step of transmitting the handover request to the destination base station by the source base station, steps 401 and 402 are performed before step 405. After obtaining the PDCP sequence number, the base station CU-CP may transmit the information of the PDCP sequence number corresponding to the MBS data through a separate message by step 405.

At step 407, the UE transmits an RRC reconfiguration complete message to the destination base station to indicate completion of the handover.

At step 408, the destination base station transmits a path switch request message to the core network.

At step 409, the core network transmits a path switch response message to the destination base station.

At step 410, the destination base station transmits a release request message to the source base station, and the source base station releases resources of the UE.

Figure 5:
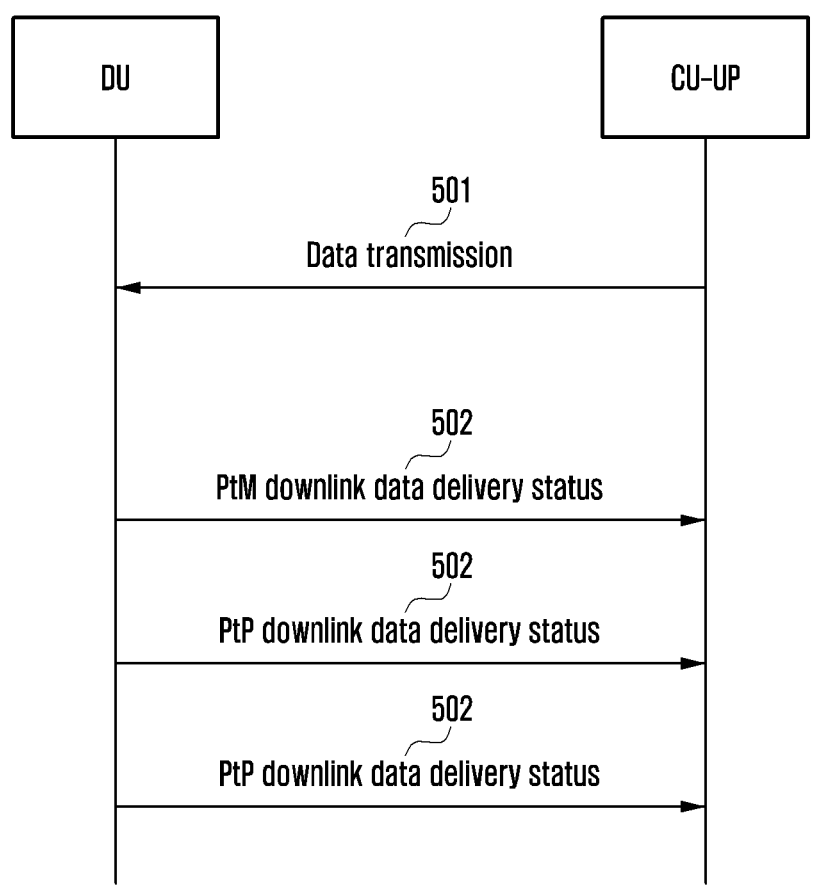
FIG. 5 illustrates a schematic diagram of an example embodiment according to yet another aspect of the present disclosure.

FIG. 5 illustrates a schematic diagram of an example embodiment according to yet another aspect of the present disclosure. The embodiment describes establishment of a PtM shared tunnel and multiple uplink PtP tunnels between a CU-UP and a DU at an F1 interface. The PtM tunnel is for a radio bearer of a multicast service, and no matter whether the DU decides to use a PtP mode or a PtM mode to transmit data to a UE, data of the multicast service is received from the CU-UP through the shared tunnel. In order for the CU-UP to receive a report of a downlink data delivery status, a PtP tunnel is established between the CU-UP and the DU for each user receiving the multicast service respectively, for receiving the report of the downlink data delivery status. In a process of establishing a multicast service bearer, the CU-UP allocates an uplink receiving address of a separate tunnel of the UE for each user receiving the multicast service respectively, for receiving an uplink message of the UE and/or the report of the downlink data delivery status. The CU-UP transmits the uplink receiving address of the tunnel to a CU-CP, so that the CU-CP carries the uplink receiving address of the tunnel assigned by the CU-UP in a message when transmitting a multicast radio bearer setup request or a modification request message to the DU. When the DU receives the multicast radio bearer setup request or the modification request message, the DU assigns a downlink data receiving address of a shared tunnel for a multicast radio bearer of each multicast service and transmits it to the CU-CP in a response message, and then the CU-CP informs the CU-UP of the downlink data receiving address. After the tunnel is established, the DU transmits a PDCP state with respect to transmission of the multicast service of each UE to the CU-UP through a separate PtP tunnel of the UE through the downlink data delivery status of a user plane. In a process of PDCP reconstruction or restart, the UE transmits the PDCP state to a PDCP protocol of the UE of the CU-UP, and the DU may also transmit the PDCP state received from the UE to the CU-UP through the separate tunnel of the UE. FIG. 5 describes the specific process of the embodiment.

At step 501, the CU-UP transmits data to the DU.

After receiving data of a certain multicast service, the CU-UP maps the data of the multicast service onto a certain corresponding multicast radio bearer, and after processing it by a PDCP protocol layer, such as adding a PDCP sequence number, and encrypting the data, etc., transmits it to the DU through an F1 shared tunnel corresponding to the multicast radio bearer. In this embodiment, the CU does not need to know whether the DU adopts the PtP or PtM mode to process the received multicast service data. In an implementation, if it is decided to perform a PtP transmission at the DU, the DU transmits the data received from the shared tunnel to a PtP RLC layer of each corresponding UE, thereby transmitting the multicast data to the corresponding UE through a dedicated wireless channel.

After receiving the data, the DU saves the data in a buffer, and transmits the data to an RLC layer of the PtP channel or an RLC layer of the PtM channel according to a decision currently made by the DU with respect to the PtP or PtM mode. The RLC layer of the PtP channel is related to each UE, and for each user who wants to receive the multicast service, a base station establishes an RLC layer of the PtP channel, while the RLC layer of the PtM channel is related to the multicast radio bearer, and for each multicast radio bearer, the base station establishes an RLC layer.

At step 502, the DU transmits the downlink data delivery status to the CU.

According to a configured cycle, or according to other configurations, or based on event triggering, the DU transmits the downlink data delivery status to the CU.

The DU transmits a downlink data delivery status report with respect to the PtM to the CU-UP through a shared channel, and transmits a downlink data delivery status report of the PtP transmission associated with one or more UEs to the CU-UP through one or more separate uplink PtP tunnels of the UE respectively. When the DU reports the downlink data delivery status to the CU-UP, the downlink data delivery status with respect to the PtM transmission or one of one or more PtP transmissions associated with one or more UEs may include one or more of the following information:

- a highest sequence number of PDCP PDUs successfully transmitted in sequence, or a highest sequence number of PDCP PDUs successfully transmitted to a lower layer. This sequence number reflects how fast the DU transmits PtM or PtP data. For example, if the downlink data delivery status with respect to the PtM transmission is reported to the CU-UP via the shared tunnel, this information item is the highest sequence number of the PDCP PDUs successfully transmitted to the lower layer; if the downlink data delivery status with respect to the PtP transmission associated with a certain UE is reported to the CU-UP via a uplink PtP tunnel associated with the UE, this information item is the highest sequence number of the PDCP PDUs successfully transmitted in sequence.
- a desired buffer size, in a unit of bits. Depending on whether the downlink data delivery status currently reported is with respect to a PtM transmission mode or a PtP transmission mode, this desired buffer size may be for the PtM transmission mode of the multicast radio bearer or the PtP transmission mode associated with the corresponding UE.
- an indication of the PtM mode or the PtP mode. The indication may indicate, for example, that the DU decides to start the PtP mode, stop the PtM mode, or vice versa.
- a sequence number of a PDCP PDU corresponding to start of the PtP mode, which indicates that the DU starts to use the PtP transmission mode after the PDCP PDU corresponding to the sequence number. Upon receiving the information, the CU-UP knows that data after the PDCP PDU sequence number are all transmitted to the UE in the PtP transmission mode. According to this, the CU-UP may receive the downlink data delivery status from the PtP tunnel, thereby obtaining a transmission status of corresponding packets.
- sequence numbers of PDCP PDUs corresponding to transmission of the PtP mode, which indicates sequence numbers of a set of PDCP PDUs transmitted in the PtP transmission mode or sequence numbers of PDCP PDUs of start and end of the PtP transmission. Upon receiving the information, the CU-UP may know which PDCP PDUs are transmitted to the UE in the PtP transmission mode. According to this, the CU-UP may obtain the transmission status of the corresponding packets from the downlink data delivery status received on the PtP tunnel.

a sequence number of a PDCP PDU corresponding to start of the PtM mode, which indicates that the DU starts to use the PtM transmission mode after the PDCP PDU corresponding to the sequence number. Upon receiving the information, the CU-UP may know that data after the sequence number of the PDCP PDU are all transmitted to the UE in the PtM transmission mode. According to this, the CU-UP may obtain the transmission status of the corresponding packets from the downlink data delivery status received on the PtM shared tunnel.

sequence numbers of PDCP PDUs corresponding to transmission of the PtM mode, which indicates sequence numbers of a set of PDCP PDUs in the PtM transmission mode or sequence numbers of PDCP PDUs of start and end of the PtM transmission. Upon receiving the information, the CU-UP may know which PDCP PDUs are transmitted to the UE in the PtM transmission mode. According to this, the CU-UP may obtain the transmission status of the corresponding packets from the downlink data delivery status received on the PtM shared tunnel.

Figure 6:
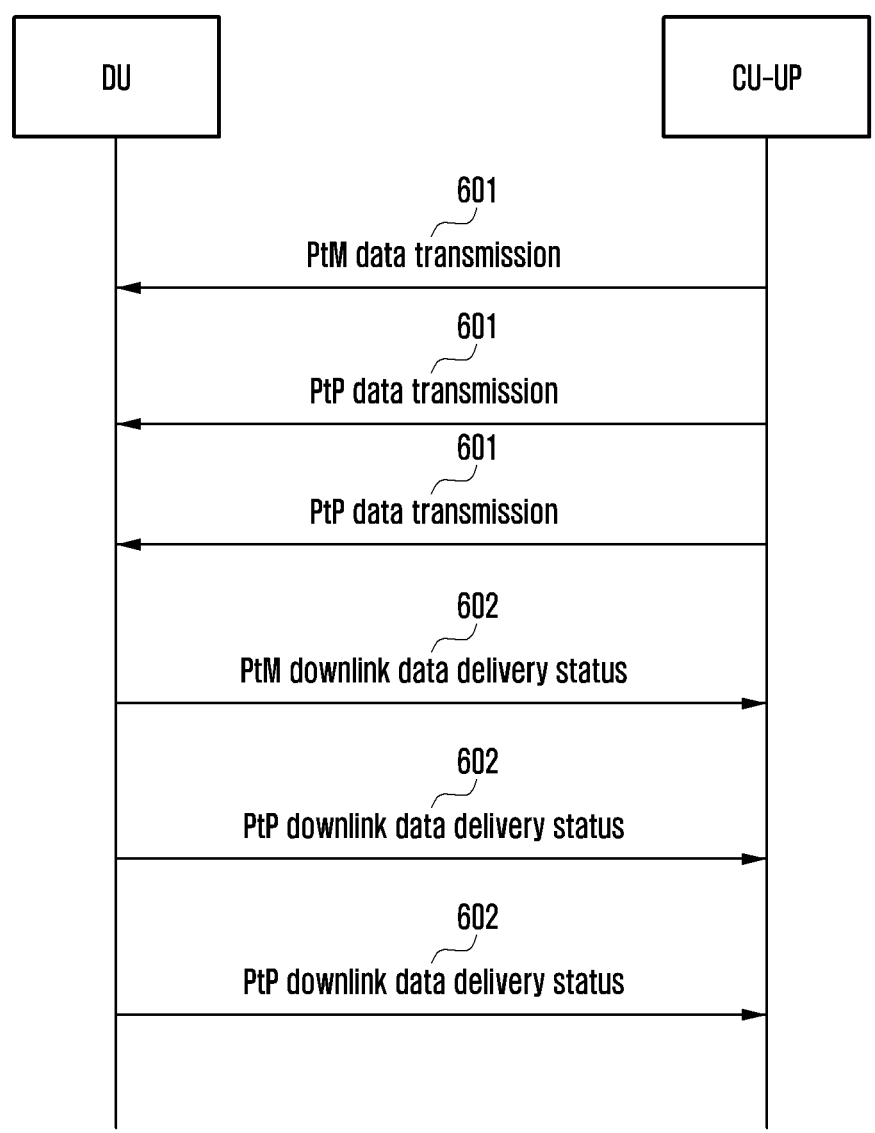
FIG. 6 illustrates a schematic diagram of an example embodiment according to still another aspect of the present disclosure.

FIG. 6 illustrates a schematic diagram of an example embodiment according to yet another aspect of the present disclosure. The embodiment describes establishment of a PtM shared tunnel and multiple PtP tunnels between a CU-UP and a DU at an F1 interface. The PtM tunnel is established for a PtM transmission mode of a radio bearer of a multicast service. When the PtM transmission mode is adopted, the CU-UP transmits MBS data to the DU through the shared tunnel. The PtP tunnels are established for each user receiving the multicast service respectively. When a PtP transmission mode is adopted, the CU-UP transmits the corresponding MBS data to the DU through the corresponding PtP tunnel. The specific process of the embodiment is schematically described in FIG. 6.

At step 601, the CU-UP transmits data to the DU.

The CU-UP receives data of a certain multicast service, maps the data of the multicast service onto a certain multicast radio bearer, and after processing it by a PDCP protocol layer, such as adding a PDCP sequence number, and encrypting the data, etc., then transmits it to the DU through an F1 tunnel corresponding to the radio bearer. In this embodiment, the CU-UP needs to know whether the DU adopts the PtP mode or the PtM mode to process the MBS data. After making a decision, the DU transmits the decision to the CU-UP via a CU-CP through a control plane, or informs the decision to the CU-UP through a user plane. If it is decided to use the PtM mode for transmission, the CU-UP transmits the data to the DU through the shared tunnel. If it is decided to use the PtP mode for transmission, the CU-UP transmits the data to a corresponding UE through a dedicated PtP tunnel.

After receiving the data, the DU saves the data in a buffer, and transmits the data to an RLC layer of the PtP channel or an RLC layer of the PtM channel according to a decision currently made by the DU. The RLC layer of the PtP channel is related to each UE, and for each user who wants to receive the multicast service, a base station establishes an RLC layer of the PtP channel, while the RLC layer of the PtM channel is related to the multicast radio bearer, and for each multicast radio bearer, the base station establishes an RLC layer.

However, in some cases, the decision of the DU and the data transmission of the CU-UP are sometimes asynchronous. For example, if the DU makes a new decision with respect to the transmission mode according to signal quality of a physical layer, when the decision has not been informed to the CU, the CU-UP transmits the data according to the previous decision, which will cause problems. For example, when receiving a packet with a PDCP sequence number of 13, the DU decides to switch the transmission from the PtM mode to the PtP mode. When the decision has not been informed to the CU-UP, the CU-UP continues transmitting the data to the DU through the PtM tunnel. When receiving the PDCP sequence number of 30, the CU-UP receives the decision from the DU, and then starts to transmit the data to the DU through the PtP tunnel. In this case, data with PDCP sequence numbers from 13 to 30 is received by the DU through the shared tunnel, but is transmitted to the UE through the PtP. The CU-UP does not know this situation. When the CU-UP performs flow control, it may schedule to the DU data that exceeds buffer capability of the DU, which cause a degradation of the performance of the flow control.

At step 602, the DU transmits a downlink data delivery status to the CU.

According to a configured cycle, or according to other configurations, or based on event triggering, the DU transmits the downlink data delivery status to the CU.

In a downlink data delivery status report, for the problem described in step 601, when the DU reports the data delivery status to the CU, the downlink data delivery status for the shared tunnel or the PtP tunnel includes one or more of the following information:

a highest PDCP PDU sequence number successfully transmitted in sequence, or a highest PDCP PDU sequence number successfully transmitted to a lower layer. This sequence number reflects how fast the DU transmits the data, and depends on whether the downlink data delivery status currently reported is for the shared tunnel or the PtP tunnel.

a desired buffer size, in a unit of bits. This desired buffer size, depending on whether the downlink data delivery status currently reported is for the shared tunnel or the PtP tunnel, represents the PtM transmission mode for the multicast radio bearer or the corresponding PtP transmission mode. In an embodiment, after the DU decides to switch the transmission mode to the PtP, this desired buffer size may be set to 0. For example, in the above example, when the data with the PDCP sequence number of 13 is successfully transmitted, the highest PDCP PDU sequence number successfully transmitted to the lower layer is set to 13, and the desired buffer size is set to 0, which represents that PtM data is not needed to be obtained. If the CU-UP receives the desired buffer of 0, it will not transmit the data on the shared tunnel. When the indicated value is included in the transmission status for the PtM mode, it is 0 or other predetermined value, which may be used to indicate stop of the PtM transmission mode or start of the PtP transmission mode.

an indication of the PtM mode or the PtP mode. The indication may indicate, for example, that the DU decides to start the PtP mode, stop the PtM mode, or vice versa.

a sequence number of a PDCP PDU corresponding to start of the PtP mode, which may indicate that the DU starts to use the PtP transmission mode after the PDCP PDU corresponding to the sequence number. Upon receiving the information, the CU-UP may know that data after the PDCP PDU sequence number are all transmitted to the UE in the PtP transmission mode. According to this, the CU-UP may obtain a transmission status of corresponding packets from the downlink data delivery status received on the PtP tunnel.

sequence numbers of PDCP PDUs corresponding to transmission in the PtP mode, which indicates sequence numbers of a set of PDCP PDUs transmitted in the PtP transmission mode or sequence numbers of PDCP PDUs of start and end of the PtP transmission. Upon receiving the information, the CU-UP may know which PDCP PDUs are transmitted to the UE in the PtP transmission mode. According to this, the CU-UP may obtain the transmission status of the corresponding packets from the downlink data delivery status received on the PtP tunnel.

a sequence number of a PDCP PDU corresponding to start of the PtM mode, which indicates that the DU starts to use the PtM transmission mode after the PDCP PDU corresponding to the sequence number. Upon receiving the information, the CU-UP may know that data after the sequence number of the PDCP PDU are all transmitted to the UE in the PtM transmission mode. According to this, the CU-UP may obtain the transmission status of the corresponding packets from the downlink data delivery status received on the PtM shared tunnel.

sequence numbers of PDCP PDUs corresponding to transmission of the PtM mode, which indicates sequence numbers of a set of PDCP PDUs in the PtM transmission mode or sequence numbers of PDCP PDUs of start and end of the PtM transmission. Upon receiving the information, the CU-UP may know which PDCP PDUs are transmitted to the UE in the PtM transmission mode. According to this, the CU-UP may obtain the transmission status of the corresponding packets from the downlink data delivery status received on the PtM shared tunnel.

In the above embodiments, it is described with the 5G system as an example of the communication system, the CU-CP as an example of the access network control plane, the CU-UP as an example of the access network user plane, and the DU as an example of the distributed unit. However, it should be understood that this description is exemplary and not limiting, and is only for the convenience of describing the principles of the present disclosure. The methods described in the present disclosure can also be applied to corresponding entities of other systems.

According to the embodiments of the present disclosure, there is provided a method for flow control of multicast transmission, which can avoid or reduce the extra overhead of multicast data transmission, improve the utilization efficiency of access network resources and/or air interface resources, reduce the transmission delay, reduce the data loss and reduce the delay caused by conversion of multicast transmission mode when the multicast transmission mode is converted.

Figure 7:
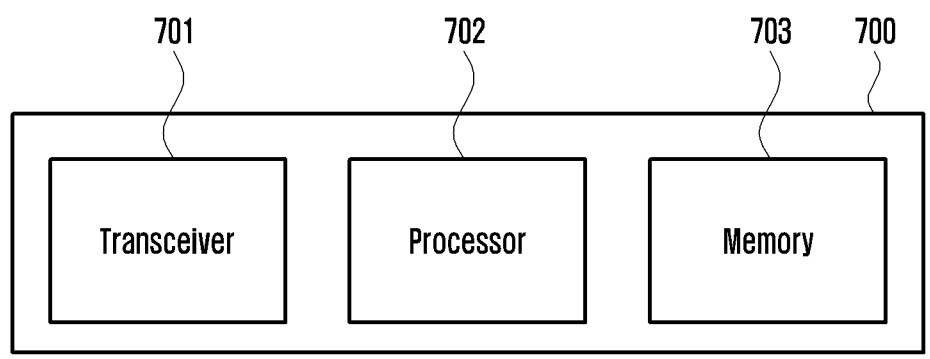
FIG. 7 illustrates a simplified block diagram of an example configuration of hardware components of a communication device according to various embodiments of the present disclosure.

FIG. 7 illustrates a simplified block diagram of an example configuration of hardware components of a communication device 700 according to various embodiments of the present disclosure, and the communication device may be configured to implement any one or more of the methods according to various embodiments of the present disclosure.

As shown in FIG. 7, the communication device 700 includes a transceiver 701, a processor 702 and a memory 703.

The transceiver 701 is configured to receive and/or transmit signals.

The processor 702 is operatively connected to the transceiver 701 and the memory 703. The processor 702 may be implemented as one or more processors for operating according to any one or more of the methods described in various embodiments of the present disclosure.

The memory 703 is configured to store computer programs and data. The memory 703 may include a non-transitory memory for storing operations and/or code instructions executable by the processor 702. The memory 703 may include non-transitory programs and/or instructions readable by the processor, which, when executed, cause the processor 702 to implement the steps of any one or more of the methods according to various embodiments of the present disclosure. The memory 703 may further include a random access memory or buffer(s) to store intermediate processing data from various functions performed by the processor 702.

Those of ordinary skill in the art will recognize that the description of the methods of the present disclosure is only illustrative and is not intended to be limited in any way. Other embodiments will be readily apparent to those of ordinary skill in the art having the benefit of the present disclosure.

For the sake of clarity, not all conventional features of the implementations of the methods and devices of the present disclosure are shown and described. Of course, it should be understood that in the development of any such actual implementations of the methods and devices, in order to achieve the specific goals of the developers, such as conforming to the constraints related to applications, systems, networks and businesses, many implementation-specific decisions may need to be made, and these specific goals will vary with different implementations and developers.

The modules, processing operations and/or data structures described according to the present disclosure may be implemented using various types of operating systems, computing platforms, network devices, computer programs and/or general-purpose machines. In addition, those skilled in the art will recognize that less general-purpose devices such as hard-wired devices, Field Programmable Gate Array (FPGA), Application Specific Integrated Circuits (ASIC), etc. may also be used. In the case that a method including a series of operations and sub-operations is implemented by a processor, computer or machine, and those operations and sub-operations may be stored as a series of non-transitory code instructions readable by the processor, computer or machine, they may be stored on a tangible and/or non-transitory medium.

The modules of the methods and devices described herein may include software, firmware, hardware or any combination(s) of software, firmware or hardware suitable for the purpose described herein.

In the methods described herein, various operations and sub-operations may be performed in various orders, and some of the operations and sub-operations may be optional.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first node in a wireless communication system, the method comprising:
    receiving, from a second node, downlink user data through a first radio bearer, the downlink user data including multicast service data;
    transmitting, to at least one user equipment (UE) configured with a radio link control acknowledge mode (RLC AM) entity and a radio link control unacknowledged mode (RLC UM) entity, the downlink user data; and
    transmitting, to the second node, a downlink data delivery status including packet data convergence protocol (PDCP) sequence number information,
    wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

2. The method of claim 1, wherein the downlink data delivery status further includes buffer size information for the first radio bearer.

3. The method of claim 1, wherein the second node is a node hosting a PDCP entity and the first node is a corresponding node interacting with the second node.

4. A method performed by a second node in a wireless communication system, the method comprising:
    transmitting, to a first node, downlink user data through a first radio bearer, the downlink user data including multicast service data; and
    receiving, from the first node, a downlink data delivery status including packet data convergence protocol (PDCP) sequence number information,
    wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

5. The method of claim 4, wherein radio link control acknowledge mode (RLC AM) entity and radio link control unacknowledge mode (RLC UM) entity is configured between the first node and a user equipment (UE).

6. The method of claim 4, wherein the downlink data delivery status further includes buffer size information for the first radio bearer.

7. The method of claim 4, wherein the second node is a node hosting a PDCP entity and the first node is a corresponding node interacting with the second node.

8. A first node in a wireless communication system, the first node comprising:
    a transceiver configured to transmit and receive a signal; and
    a processor coupled with the transceiver and configured to:
        receive, from a second node, downlink user data through a first radio bearer, the downlink user data including multicast service data,
        transmit, to at least one user equipment (UE) configured with a radio link control acknowledge mode (RLC AM) entity and a radio link control unacknowledged mode (RLC UM) entity, the downlink user data, and
        transmit, to the second node, a downlink data delivery status including packet data convergence protocol (PDCP) sequence number information,
    wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

9. The first node of claim 8, wherein the downlink data delivery status further includes buffer size information for the first radio bearer.

10. The first node of claim 8, wherein the second node is a node hosting a PDCP entity and the first node is a corresponding node interacting with the second node.

11. A second node in a wireless communication system, the second node comprising:
    a transceiver configured to transmit and receive a signal; and
    a processor coupled with the transceiver and configured to:
        transmit, to a first node, downlink user data through a first radio bearer, the downlink user data including multicast service data, and
        receive, from the first node, a downlink data delivery status including packet data convergence protocol (PDCP) sequence number information,
    wherein the PDCP sequence number information includes a higher PDCP sequence number between a highest PDCP sequence number successfully delivered in sequence associated with a first transmission mode and a highest PDCP sequence number transmitted to lower layers associated with a second transmission mode.

12. The second node of claim 11, wherein the downlink data delivery status further includes buffer size information for the first radio bearer.

13. The method of claim 1,
    wherein the first node decides a transmission mode for the at least one UE.

14. The method of claim 4,
    wherein the first node decides a transmission mode for the at least one UE.

15. The first node of claim 8,
    wherein the first node decides a transmission mode for the at least one UE.

16. The second node of claim 11,
    wherein the first node decides a transmission mode for the at least one UE.

* * * * *